(12) United States Patent
Yamashita

(10) Patent No.: US 10,833,466 B2
(45) Date of Patent: Nov. 10, 2020

(54) ROTARY CONNECTOR DEVICE

(71) Applicants: FURUKAWA ELECTRIC CO., LTD., Tokyo (JP); FURUKAWA AUTOMOTIVE SYSTEMS INC., Inukami-gun, Shiga (JP)

(72) Inventor: Kendy Rodrigo Yamashita, Inukami-gun (JP)

(73) Assignees: FURUKAWA ELECTRIC CO., LTD., Tokyo (JP); FURUKAWA AUTOMOTIVE SYSTEMS INC., Shiga (JP)

( * ) Notice: Subject to any disclaimer, the term of this patent is extended or adjusted under 35 U.S.C. 154(b) by 0 days.

(21) Appl. No.: 16/328,966

(22) PCT Filed: Aug. 10, 2017

(86) PCT No.: PCT/JP2017/029112
§ 371 (c)(1),
(2) Date: Feb. 27, 2019

(87) PCT Pub. No.: WO2018/043093
PCT Pub. Date: Mar. 8, 2018

(65) Prior Publication Data
US 2019/0280443 A1    Sep. 12, 2019

(30) Foreign Application Priority Data
Aug. 30, 2016  (JP) ................................. 2016-167454

(51) Int. Cl.
*H01R 35/04*    (2006.01)
*B60R 16/027*   (2006.01)
(Continued)

(52) U.S. Cl.
CPC ........... *H01R 35/04* (2013.01); *B60R 16/027* (2013.01); *B60R 21/16* (2013.01); *B62D 1/10* (2013.01); *H01R 13/66* (2013.01); *H01R 35/025* (2013.01)

(58) Field of Classification Search
CPC ...... H01R 35/00; H01R 35/02; H01R 35/025; H01R 35/04; H01R 13/66; B60R 21/16; B60R 16/027; B62D 1/10
See application file for complete search history.

(56) References Cited

U.S. PATENT DOCUMENTS 5,242,309 A * 9/1993 Hasegawa ............ H01R 35/025
                                                   439/15
5,246,377 A * 9/1993 Kawahara ............ H01R 35/025
                                                   439/15
(Continued)

FOREIGN PATENT DOCUMENTS

CN    103210553 A    7/2013
CN    204947295 U    1/2016
(Continued)

OTHER PUBLICATIONS

International Search Report (PCT/ISA/210) issued in PCT/JP2017/029112, dated Oct. 24, 2017.
(Continued)

*Primary Examiner* — Oscar C Jimenez
(74) *Attorney, Agent, or Firm* — Birch, Stewart, Kolasch & Birch, LLP (57) ABSTRACT

Provided is a rotary connector device capable of improving the reliability of electric connection. A rotary connector device (1) includes a stator (11), a rotator (12) rotatably attached to the stator (11), and a flexible flat cable group (13) housed capably of being wound and rewound in an annular space (S1) formed between the stator (11) and the rotator (12) around an axis line (x). The FFC group (13) includes a (Continued)

first FFC (41) wound on the inner peripheral side of the annular space (S1), and a second FFC (42) wound on the outer peripheral side with respect to the first FFC (41), having a length in the annular space (S1) longer than that of the first FFC (41). The second FFC (42) includes both conductors (42-1*b* to 42-1*e*) constituting an airbag circuit and a conductor (42-1*f*) constituting a horn circuit.

6 Claims, 5 Drawing Sheets

(51) Int. Cl.
    *B60R 21/16*    (2006.01)
    *B62D 1/10*    (2006.01)
    *H01R 13/66*    (2006.01)
    *H01R 35/02*    (2006.01)

(56) References Cited

U.S. PATENT DOCUMENTS

| | | | | | |
|---|---|---|---|---|---|
| 5,413,492 | A | * | 5/1995 | Obata | B60R 16/027 |
| | | | | | 439/164 |
| 5,980,287 | A | * | 11/1999 | Sasaki | H01R 35/025 |
| | | | | | 439/15 |
| 6,299,466 | B1 | * | 10/2001 | Bolen | B60R 16/027 |
| | | | | | 439/164 |
| 2001/0044229 | A1 | | 11/2001 | Bunselmeier et al. | |
| 2002/0019169 | A1 | * | 2/2002 | Nishimoto | H01R 35/025 |
| | | | | | 439/625 |
| 2002/0115312 | A1 | * | 8/2002 | Matsuzaki | H01R 35/025 |
| | | | | | 439/15 |
| 2003/0094955 | A1 | * | 5/2003 | Bonn | B60R 16/027 |
| | | | | | 324/539 |
| 2004/0209505 | A1 | * | 10/2004 | Wade | B60R 16/027 |
| | | | | | 439/164 |
| 2008/0254646 | A1 | | 10/2008 | Reischl et al. | |
| 2013/0252441 | A1 | | 9/2013 | Yamaguchi | |
| 2013/0344706 | A1 | | 12/2013 | Sato et al. | |
| 2014/0051267 | A1 | * | 2/2014 | Asakura | B60R 16/027 |
| | | | | | 439/15 |
| 2014/0057462 | A1 | | 2/2014 | Takahashi | |
| 2016/0006203 | A1 | * | 1/2016 | Takahashi | B60R 16/027 |
| | | | | | 439/13 |
| 2016/0336704 | A1 | * | 11/2016 | Tsushima | H01R 43/20 |

FOREIGN PATENT DOCUMENTS

| | | |
|---|---|---|
| DE | 19533439 C1 | 2/1997 |
| EP | 1981131 A1 | 10/2008 |
| JP | 2001-015240 A | 1/2001 |
| JP | 2001-102144 A | 4/2001 |
| JP | 2001-213249 A | 8/2001 |
| JP | 2003-502987 A | 1/2003 |
| JP | 2009-170174 A | 7/2009 |
| JP | 2013-191437 A | 9/2013 |
| JP | 2014-041795 A | 3/2014 |
| JP | 2016-058354 A | 4/2016 |

OTHER PUBLICATIONS

Written Opinion (PCT/ISA/237) issued in PCT/JP2017/029112, dated Oct. 24, 2017.
International Preliminary Report and English translation of the Written Opinion of the International Searching Authority (Forms PCT/IB/373 and PCT/ISA/237) for International Application No. PCT/JP2017/029112, dated Mar. 5, 2019.
Chinese Office Action and Search Report for corresponding Chinese Application No. 201780051775.3, dated Jan. 3, 2020, with English translation.
Japanese Office Action, dated Apr. 21, 2020, for corresponding Japanese Application No. 2016-167454, along with an English translation.
Notification of Reason for Refusal dated Apr. 1, 2020 in corresponding Korean Patent Application No. 10-2019-7005803, with English translation.
Extended European Search Report for corresponding European Application No. 17846101.8, dated Apr. 20, 2020.
Chinese Office Action and Search Report, dated Aug. 20, 2020, for corresponding Chinese Application No. 201780051775 3. with English translations.

* cited by examiner

ROTARY CONNECTOR DEVICE

TECHNICAL FIELD

The present invention relates to a rotary connector device and, more particularly, to a rotary connector device having a circuit structure formed by flexible flat cables.

BACKGROUND ART

In a vehicle such as a four-wheeled automobile, a rotary connector device for supplying electric power to airbag devices or the like is attached to a connecting portion between a steering wheel for steering and a steering shaft. The rotary connector device is attached to surround the steering shaft, and a steering column cover is attached so as to enclose the rotary connector device and the end portion of the steering shaft. In addition, a steering lower cover is attached to the steering wheel so as to enclose the boss portion of the steering wheel.

The rotary connector device includes a stator, a rotator rotatably attached to the stator, and flexible flat cables (FFCs) wound and housed in an annular space formed by the stator and the rotator. The FFC has a laminate structure sandwiching a plurality of metal-made conductor portions via adhesive layers between two insulator films including a resin. The plurality of conductors in the FFC constitute electric circuits associated with each of various devices such as an airbag mounted on a vehicle.

For example, a known rotary connector device includes a fixed-side housing, a movable-side housing coaxially and rotatably coupled to the fixed-side housing, two flexible cables housed in an annular cable housing space formed between the both housings, and a moving body rotatably housed in the cable housing space (Patent Document 1). In the rotary connector device, among the two flexible cables, a first flexible cable carries two airbag circuit conductors having large wire widths, and four horn circuit and switch circuit conductors having smaller wire widths than those of the airbag circuit conductors, and a second flexible cable carries eight horn circuit and switch circuit conductors having small wire widths. (Patent Document 1)

CITATION LIST

Patent Literature

Patent Document 1: JP 2001-15240 A

SUMMARY OF INVENTION

Technical Problem

However, in the known technology mentioned above, as the airbag circuit conductors are provided only in the first FFC to assign one path to the airbag circuit, there is a possibility that the airbag malfunctions when a failure occurs in the airbag circuit conductors due to deterioration over time by steering, or the like, thus the reliability of connection is not sufficient. In particular, while the airbag is one of the safety devices to protect occupants of the vehicle and high reliability is required for the airbag operation in an emergency such as an accident, the malfunction of the airbag due to disconnection in the airbag circuit poses a problem in the context of safety.

In addition, when a failure occurs in the horn circuit conductors and disconnects the horn circuit, driving a vehicle in such a condition is prohibited by law. That is, since the connection state (closed state) of the horn circuit is indispensable for driving a vehicle, it is necessary to examine the arrangement or configuration of the horn circuit conductors while considering external force and the like received by the FFC from steering within the rotary connector device.

However, the known technology mentioned above goes no further than providing each of the two FFCs with the horn circuit conductors in common with the other switch circuit conductors, or altering the wire widths of the horn circuit conductors smaller than those of the airbag circuit conductors and larger than those of the other switch circuit conductors, thus the configuration or arrangement is not examined with enough consideration for resistance to disconnection of the horn circuit, therefore the reliability of connection in the horn circuit is not sufficient.

Further, in the rotary connector device in the related art, there is no definition or reference as to at which part of which FFC the conductors associated with the electric circuits of various devices in the vehicle are to be arranged, thus arrangement positions and conductor widths are determined without considering characteristics of each electric circuit. Accordingly, when a single or dual airbag circuit is formed by routing without considering the arrangement relation between the airbag circuit conductors and large current circuit conductors, a crossed-wire phenomenon may occur due to insulation failure or noise and generate erroneous explosion of the airbag.

An object of the present invention is to provide a rotary connector device capable of improving the reliability of electric connection.

Solution to Problem

In order to achieve the above object, a rotary connector device according to the present invention includes a stator, a rotator rotatably connected to the stator, and a flexible flat cable group housed capably of being wound and rewound in an annular space between the stator and the rotator, the flexible flat cable group including a first flexible flat cable wound on an inner peripheral side of the annular space, and a second flexible flat cable wound on an outer peripheral side with respect to the first flexible flat cable, having a longitudinal length in the annular space longer than that of the first flexible flat cable, the second flexible flat cable including both first conductors constituting an airbag circuit, and a second conductor constituting a horn circuit.

The second flexible flat cable includes the first conductors constituting the airbag circuit and the second conductor constituting the horn circuit, the first conductors and the second conductors being arranged side by side, and the first conductors and the second conductor are arranged at the width-direction center portion of the second flexible flat cable.

The second flexible flat cable may include at least another conductor arranged on at least one of width-direction opposite end sides of the first conductors and the second conductor.

The rotary connector device further includes a spare flexible flat cable wound on an outer peripheral side with respect to the second flexible flat cable, being redundant of the second flexible flat cable, and the spare flexible flat cable may include both other first conductors constituting an airbag circuit, and another second conductor constituting the horn circuit.

The rotary connector device further includes a third flexible flat cable wound on an outer peripheral side with respect to the second flexible flat cable, having a longitudinal length in the annular space longer than that of the second flexible flat cable, and the third flexible flat cable includes third conductors constituting a large current circuit through which larger current flows than an airbag circuit.

The width of the third conductor constituting the large current circuit is larger than that of the first conductor constituting the airbag circuit.

The first flexible flat cable includes at least one fourth conductor constituting an abnormality detection circuit for detecting abnormality of the first flexible flat cable.

Advantageous Effects of Invention

According to the present invention, the reliability of electric connection in a rotary connector device can be improved.

DESCRIPTION OF EMBODIMENTS

The embodiments of the present invention will be described in detail below with reference to the drawings.

Figure 1:
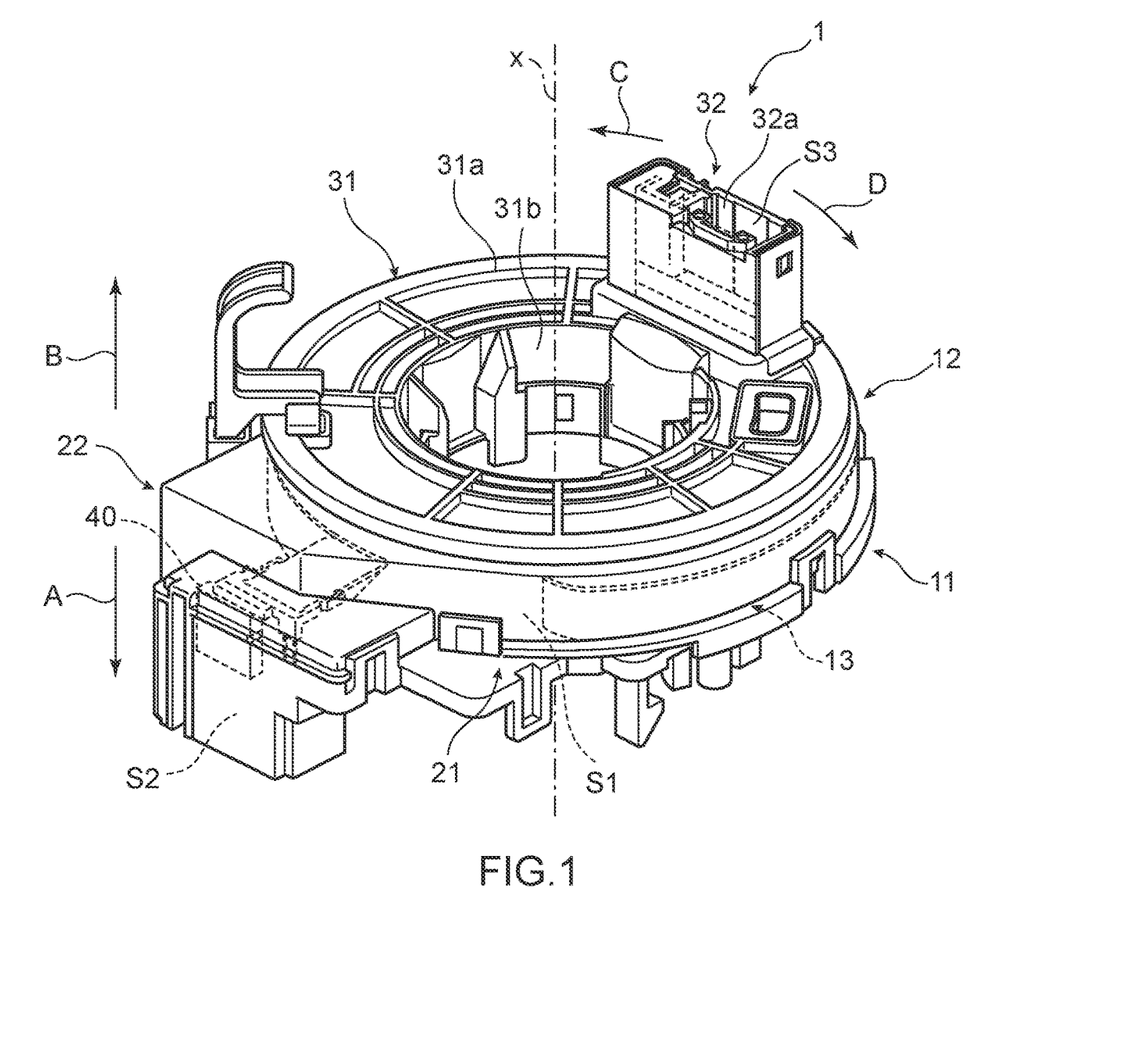
FIG. 1 is a perspective view schematically illustrating a rotary connector device according to an embodiment of the present invention.

FIG. 1 is a perspective view schematically illustrating a rotary connector device according to an embodiment. Note that, the rotary connector device in FIG. 1 illustrates one example, and the configuration of the rotary connector device according to the present invention is not limited to that illustrated in FIG. 1.

In FIG. 1, the rotary connector device 1 includes a stator 11, a rotator 12 rotatably attached to the stator 11, and a flexible flat cable group 13 (hereinafter referred to as an FFC group) housed capably of being wound and rewound in an annular space S1 formed between the stator 11 and the rotator 12 around an axis line x. In a vehicle, the stator 11 is fixed to a vehicle body, and the rotator 12 is attached to a steering wheel.

The stator 11 includes a stator main body 21 in an annular or substantially annular shape centered on the axis line x, including a circular engagement hole (not illustrated) centered on the axis line x, and a stator-side connector housing portion 22 forming a stator-side connector housing space S2.

The engagement hole formed in the stator main body 21 is formed capable of receiving a lower end portion (in the direction of arrow A in FIG. 1) of a cylindrical portion 31b (described below) in the rotator 12 and engaging with this end portion. The rotator 12 is rotatably engaged with the engagement hole of the stator main body 21 of the stator 11 at the lower end portion of the cylindrical portion 31b, accordingly the rotator 12 is rotatably retained by the stator 11.

The rotator 12 includes a rotator main body 31 in an annular shape provided around the axis line x (in the direction of arrow C and the direction of arrow D in FIG. 1), and a rotator-side connector housing portion 32 for communicating the annular space S1 and the outside and defining a rotator-side connector housing space S3.

The rotator main body 31 includes a top plate portion 31a in a hollow disk shape or substantially hollow disk shape centered on the axis line x, and a cylindrical portion 31b extending from the end portion on the inner peripheral side of the top plate portion 31a toward the annular space S1 along the axis line x. The top plate portion 31a defines a portion facing upward (in the direction of arrow B in FIG. 1) in the rotary connector device 1. The cylindrical portion 31b is formed to engage with a corresponding portion of the stator 11 in a rotatable manner around the axis line x.

As described above, when the rotator 12 is attached to the stator 11, the top plate portion 31a and the cylindrical portion 31b of the rotator 12 as well as the stator main body 21 of the stator 11 define the annular space S1.

Within the annular space S1, the FFC group 13 including a plurality of FFCs is wound with a slack of an appropriate length, and the slack length changes as the rotator 12 rotates against the stator 11. In order to follow the change in the slack length, respective FFCs of the FFC group 13 may be configured to be retained in a state always arranged within the annular space S1.

An end portion of the FFC group 13 drawn out from the annular space S1 is inserted into the stator-side connector housing space S2 of the stator-side connector housing portion 22. In addition, the stator-side connector housing portion 22 is formed with a fixed-side terminal insertion hole (not illustrated) into which terminals in a predetermined shape, being connected to wire harnesses constituting electric circuits on the vehicle body side, can be inserted. The terminals and the conductor portions of the FFCs 13 are connected via an FFC connection structure tool 40 arranged in the stator-side connector housing space S2 of the stator-side connector housing portion 22.

Into the rotator-side connector housing space S3 of the rotator-side connector housing portion 32, as the stator-side connector housing space S2 described above, an end portion of the FFC group 13 drawn out from the annular space S1 is inserted. In addition, the rotator-side connector housing portion 32 is formed with a rotating-side terminal insertion hole 32a into which cable terminals drawn out from electrical components (for example, horn, switch, and airbag modules, etc.) of the steering wheel can be inserted. The cable terminals and the conductor portions of the FFC group 13 are connected via an FFC connection structure tool (not illustrated) arranged in the rotator-side connector housing space S3 of the rotator-side connector housing portion 32.

With the configuration described above, electrical components such as an airbag module on the steering wheel side and electric circuits on the vehicle side are electrically connected via the FFC group 13.

Figure 2:
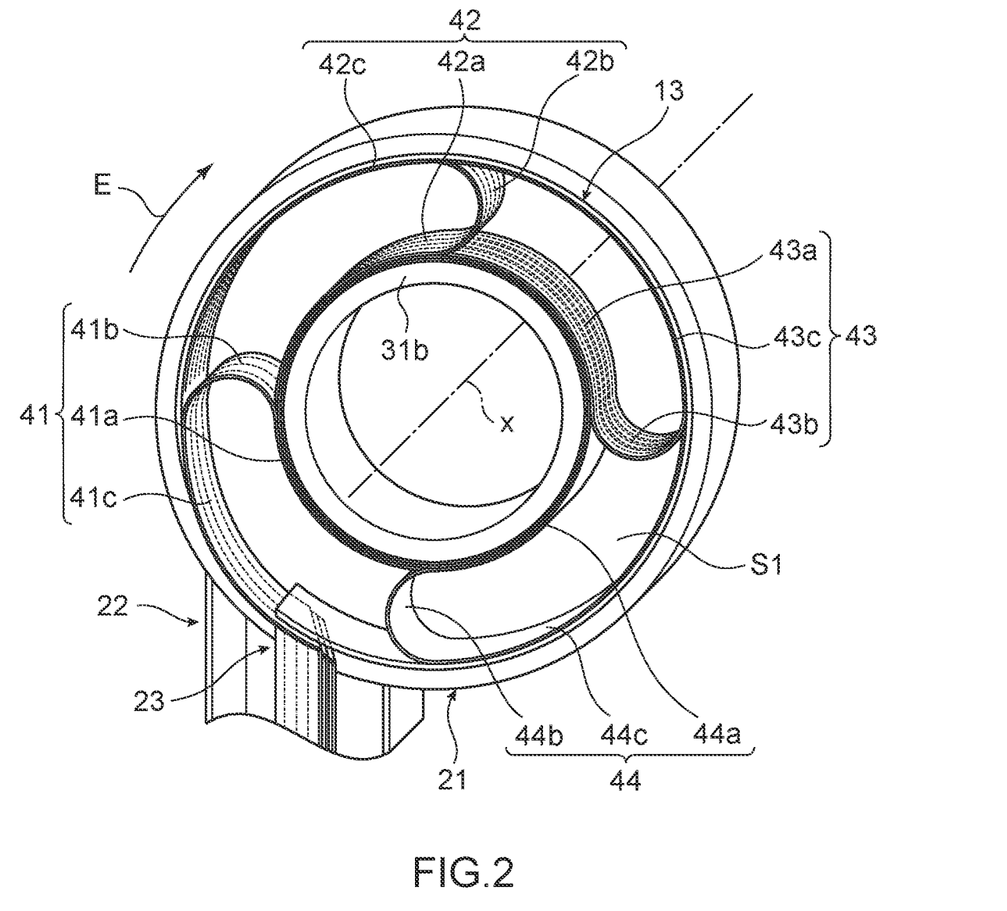
FIG. 2 is a perspective view illustrating an arrangement of a flexible flat cable group housed in an annular space in FIG. 1.

FIG. 2 is a perspective view illustrating an arrangement of the FFC group 13 housed in the annular space S1 of FIG. 1.

As illustrated in FIG. 2, the FFC group 13 includes a first FFC 41 wound on the inner peripheral side of the annular space S1, a second FFC 42 wound on the outer peripheral side with respect to the first FFC 41 and having a length in the annular space S1 longer than that of the first FFC 41, a third FFC 43 wound on the outer peripheral side with respect to the second FFC 42 and having a length in the annular space S1 longer than that of the second FFC 42, and a dummy cable 44 wound on the outer peripheral side with respect to the third FFC 43 and having a length in the annular space S1 longer than that of the third FFC 43. In the embodiment, within the annular space S1, four cables are arranged in rotational symmetry by substantially 90 degrees. The first FFC 41 has the shortest length among the four cables, and then the second FFC 42, the third FFC 43, and the dummy cable 44 are configured to have longer lengths in the described ascending order. In addition, at the portion where the first FFC 41 to the third FFC 43 overlap each other, the second FFC 42 is arranged between the first FFC 41 and the third FFC 43, and three cables of the first FFC 41 to the third FFC 43 arranged in this order are drawn out from the annular space S1 to the stator-side connector housing space S2 of the stator-side connector housing portion 22 via a communication portion 23. The communication portion 23 is formed, for example, on the outer peripheral portion of the stator main body 21, as a notch provided between the annular space S1 and the stator-side connector housing space S2.

Within the annular space S1, the first FFC 41 includes an inner periphery portion 41a wound one or a plurality of times around the cylindrical portion 31b of the rotator 12, a folding back portion 41b bent and folded back at the longitudinal middle part of the first FFC 41, and an outer periphery portion 41c arranged opposite to a part of the inner periphery portion 41a by the folding back at the folding back portion 41b. When the rotator 12 is rotated clockwise or counterclockwise, the first FFC 41 is wound or rewound while maintaining the bending at the folding back portion 41b.

As the first FFC 41, within the annular space S1, the second FFC 42 includes an inner periphery portion 42a wound one or a plurality of times around the cylindrical portion 31b of the rotator 12, a folding back portion 42b bent and folded back at the longitudinal middle part of the second FFC 42, and an outer periphery portion 42c arranged opposite to a part of the inner periphery portion 42a by the folding back at the folding back portion 42b. When the rotator 12 is rotated clockwise or counterclockwise, the second FFC 42 is wound or rewound while maintaining the bending at the folding back portion 42b.

As the first FFC 41, within the annular space S1, the third FFC 43 includes an inner periphery portion 43a wound one or a plurality of times around the cylindrical portion 31b of the rotator 12, a folding back portion 43b bent and folded back at the longitudinal middle part of the third FFC 43, and an outer periphery portion 43c arranged opposite to a part of the inner periphery portion 43a by the folding back at the folding back portion 43b. When the rotator 12 is rotated clockwise or counterclockwise, the third FFC 43 is wound or rewound while maintaining the bending at the folding back portion 43b.

As the first FFC 41, within the annular space S1, the dummy FFC 44 also includes an inner periphery portion 44a wound one or a plurality of times around the cylindrical portion 31b of the rotator 12, a folding back portion 44b bent and folded back at the longitudinal middle part of the dummy FFC 44, and an outer periphery portion 44c arranged opposite to a part of the inner periphery portion 44a by the folding back at the folding back portion 44b. When the rotator 12 is rotated clockwise or counterclockwise, the dummy FFC 44 is wound or rewound while maintaining the bending at the folding back portion 44b.

The first FFC 41, the second FFC 42, and the third FFC 43 each have a plurality of conductors, and each conductor constitutes an electric circuit of various devices. The dummy cable 44 includes a flexible long thin plate member not including a conductor, and provided in order to maintain the arrangement state of the first FFC 41, the second FFC 42, and the third FFC 43. The long thin plate member includes a resin such as plastic.

The longitudinal length of the FFC in the annular space S1 refers to the length from a welded portion of a stator-side primary mold (not illustrated) within the FFC connection structure tool 40 arranged in the stator-side connector housing space S2, to a welded portion of a rotator-side primary mold (not illustrated) within an FFC connection structure tool (not illustrated) arranged in the rotator-side connector housing space S3, and the first FFC 41 to the third FFC 43 each have different lengths between their welded portions. In other words, the longitudinal length of the FFC in the annular space S1 substantially corresponds to an extra length of the FFC within the annular space S1, and the extra length of the FFC within the annular space S1 corresponds to the total length of the folding back portion and the outer periphery portion of the FFC within the annular space S1. In the embodiment, given that, when viewing the annular space S1 clockwise (in the direction of arrow E in FIG. 2) from the rotator 12 side to the stator 11 side, the length from the arranged position of the communication portion 23 to the arranged position of the folding back portion corresponds to the length of the outer periphery portion, and the respective lengths of the folding back portions are substantially equal to each other due to the approximately identical bending radii, the total length of the folding back portion and the outer periphery portion of each FFC becomes longer in the ascending order of the first FFC 41, the second FFC 42, and the third FFC 43. Thus, the extra lengths of the three FFCs within the annular space S1 become longer in the ascending order of the first FFC 41, the second FFC 42, and the third FFC 43, and the longitudinal lengths of the three FFCs within the annular space S1 become longer in this ascending order. In other words, the extra length of the second FFC 42 is longer than the extra length of the first FFC 41, and the extra length of the third FFC 43 is the longest among the three cables of the first FFC 41 to the third FFC 43.

Figure 3A:
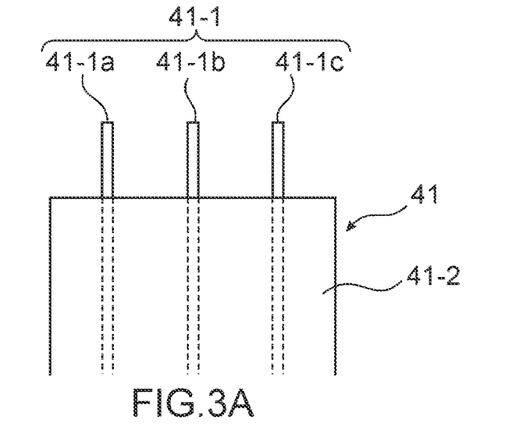
FIGS. 3(A) to 3(C) are plan views illustrating detailed configurations of first to third flexible flat cables in FIG. 2.
Figure 3B:
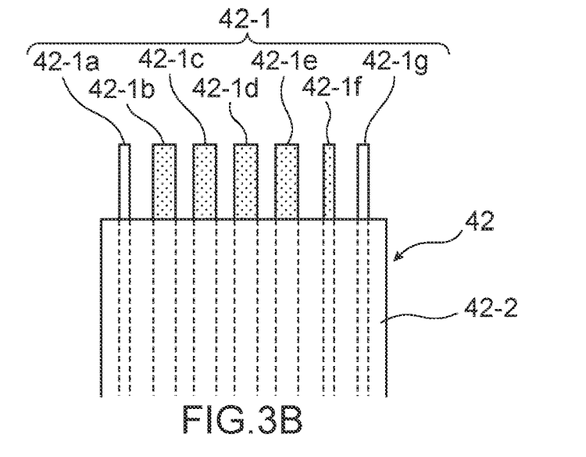
Figure 3C:
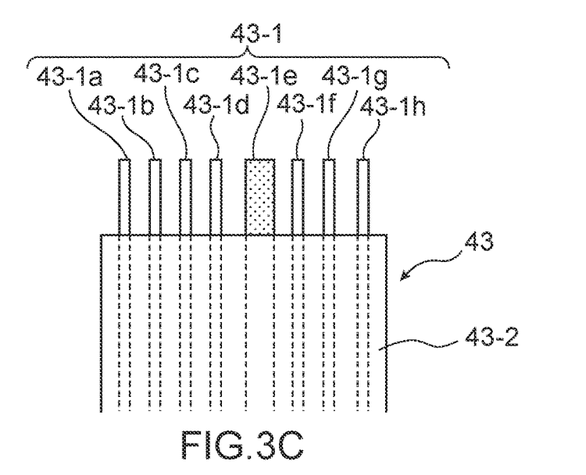

FIGS. 3(A) to 3(C) are plan views illustrating detailed configurations of respective FFCs in FIG. 2.

As illustrated in FIG. 3(A), the first FFC 41 includes a conductor group 41-1 including conductors 41-1a, 41-1b, and 41-1c (fourth conductors), and two insulator films 41-2 arranged to sandwich the conductor group 41-1 via adhesive layers (not illustrated). The conductors 41-1a to 41-1c include, for example, a single layer of copper or a copper alloy or multiple layers including a copper or copper alloy layer and a plating layer, and are arranged to have in-plane directions of their rolled surfaces substantially in the same direction. Each of the conductors 41-1a to 41-1c has a width of 0.8 mm to 1 mm, and a thickness of 0.02 mm to 0.05 mm, for example.

The insulator film 41-2 preferably includes a resin capable of exhibiting good adhesion with the adhesive layer (not illustrated) and/or the conductor group 41-1. In addition, as an appropriate example, the insulator film 41-2 may include two layers including an external layer of polyethylene terephthalate which will not melt when fusing the adhesive layer due having a melting point equal to or higher than 200 degrees Celsius, and a polyester resin adhesive layer. The insulator film 41-2 has a width of 6 mm to 15 mm, and a thickness of 0.01 mm to 0.05 mm, for example.

The conductors 41-1a to 41-1c are connected to an abnormality detection circuit for detecting an abnormality such as a disconnection of the first FFC 41. That is, the first FFC 41 includes three conductors 41-1a to 41-1c constituting the abnormality detection circuit for detecting an abnormality in the first FFC 41. As described above, the extra length of the first FFC 41 is the shortest among the three cables of the first FFC 41 to the third FFC 43. Thus, when the rotator 12 is rotated by steering, the conductor group 41-1 easily receives longitudinal tensile force (external force), and has a high possibility of occurrence of a failure such as a disconnection. Therefore, the conductors 41-1a to 41-1c constituting the abnormality detection circuit are arranged in the first FFC 41 which has a higher possibility of failure such as disconnection compared to the other cables.

As illustrated in FIG. 3(B), the second FFC 42 includes a conductor group 42-1 including conductors 42-1a, 42-1b, 42-1c, 42-1d, 42-1e, 42-1f, and 42-1g, and two insulator films 42-2 arranged to sandwich the conductor group 42-1 via adhesive layers (not illustrated). The conductors 42-1a to 42-1g include, for example, a copper alloy, and are arranged to have in-plane directions of their rolled surfaces substantially in the same direction. Among the conductors 42-1a to 42-1g, each of the conductors 42-1b to 42-1e has a width of 1.5 mm to 2 mm, and a thickness of 0.02 mm to 0.05 mm for example, and their respective widths are larger than those of the other conductors 42-1a, 42-1f, and 42-1g. As the configuration of the insulator film 42-2 is basically the same as that of the insulator film 41-2, the description thereof is omitted.

Among the conductors 42-1a to 42-1g, the four conductors 42-1b to 42-1e are connected to an airbag circuit, and the conductor 42-1f is connected to a horn circuit. That is, the second FFC 42 includes both the conductors 42-1b to 42-1e (first conductors) constituting the airbag circuit and the conductor 42-1f (second conductor) constituting the horn circuit. As described above, since the extra length of the second FFC 42 is longer than that of the first FFC 41, when the rotator 12 is rotated by steering, the conductor group 42-1 is less susceptible to longitudinal tensile force (external force) than the conductor group 41-1. Therefore, the conductors 42-1b to 42-1e constituting the airbag circuit and the conductor 42-1f constituting the horn circuit are both arranged in the second FFC 42 which is less likely to have a failure such as disconnection compared to the other cables.

In addition, among the conductors 42-1b to 42-1e, the conductors 42-1b (AB+) and 42-1c (AB−) constitute one path of the airbag circuit, and the conductors 42-1d (AB+') and 42-1e (AB−') constitute another path of the airbag circuit. Specifically, the conductors 42-1b to 42-1e constitute an ignition output dual circuit of a two-stage gas generator (dual inflator), then the conductors 42-1b to 42-1c are connected to one inflator provided in the airbag, and the conductors 42-1d to 42-1e are connected to the other inflator provided in the same airbag, respectively. Then, the two ignition output dual circuits are used to adjust the ignition timing based on various input information such as an impact applied to the vehicle, thereby the expansion amount of the airbag can be controlled.

In the second FFC 42, the conductors 42-1b to 42-1e constituting the airbag circuit and the conductor 42-1f constituting the horn circuit are arranged side by side, and the conductors 42-1b to 42-1e and 42-1f are arranged at the width-direction center portion of the second FFC 42, and further the second FFC 42 includes the conductor 42-1a and the conductor 42-1 g (other conductors) arranged on both width-direction opposite end sides of the conductors 42-1b to 42-1e and 42-1f. Thus, none of the conductors 42-1b to 42-1f are arranged at the outermost portion with respect to the width direction of the second FFC 42, and they are positioned inside of the width direction of the second FFC 42. Further, the second FFC 42 may include the conductor 42-1a and/or the conductor 42-1 g (at least one of the other conductors) arranged on at least one of width-direction opposite end sides of the conductors 42-1b to 42-1e and 42-1f.

As illustrated in FIG. 3(C), the third FFC 43 includes a conductor group 43-1 including conductors 43-1a, 43-1b, 43-1c, 43-1d, 43-1e, 43-1f, 43-1g, and 43-1h (third conductors), and two insulator films 43-2 arranged to sandwich the conductor group 43-1 via adhesive layers (not illustrated). The conductors 43-1a to 43-1h include, for example, a copper alloy, and are arranged to have in-plane directions of their rolled surfaces substantially in the same direction. Among the conductors 43-1a to 43-1h, the conductor 43-1e has a width of 1.5 mm to 2 mm and a thickness of 0.02 mm to 0.05 mm, for example, and the width is larger than widths of the other conductors 43-1a to 43-1d and 43-1f to 43-1h. As the configuration of the insulator film 43-2 is basically the same as that of the insulator film 41-2, the description thereof is omitted.

Among the conductors 43-1a to 43-1h, the conductor 43-1e is connected to a large current circuit through which larger current flows than the airbag circuit. That is, the third FFC 43 includes the conductor 43-1e constituting the large current circuit through which larger current flows than the airbag circuit. The large current circuit is, for example, an illumination circuit. As described above, since the extra length of the third FFC 43 is longer than that of the first FFC 41, when the rotator 12 is rotated by steering, the conductor group 43-1 is less susceptible to longitudinal tensile force (external force) than the conductor group 41-1. Therefore, the conductors 43-1e constituting the large current circuit is arranged in the third FFC 43 which is less likely to have a failure such as disconnection compared to the other cables.

The width of the conductor 43-1e is preferably larger than any width of the conductors 42-1b to 42-1e constituting the airbag circuit. Thereby, the conductor 43-1e constituting the large current circuit becomes more resistant to disconnection, and also able to support large current and to reduce noise. In addition, the conductor 43-1e is preferably arranged at the width-direction center portion of the third FFC 43. Thereby, the conductor 43-1e becomes less susceptible to external force applied to the width-direction end surface of the third FFC 43, and a crack progressing from the end surface cannot easily reach the conductor 43-1e, thus the large current circuit such as an illumination circuit can be prevented from being disconnected.

As described above, according to the embodiment, the first FFC 41 is wound on the inner peripheral side of the annular space S1, and the second FFC 42 is wound on the outer peripheral side with respect to the first FFC 41 and has a length longer than that of the first FFC 41. Then, the second FFC 42 includes both the conductors 42-1b to 42-1e constituting the airbag circuit and the conductor 42-1f constituting the horn circuit. Thus, by arranging the conductors 42-1b to 42-1e constituting the airbag circuit and the conductor 42-1f constituting the horn circuit both in the single second FFC 42, and also arranging the second FFC 42 on the outer peripheral side of the first FFC 41, both the conductors 42-1b to 42-1e and 42-1f become less susceptible to external force by steering, and the airbag circuit and the horn circuit become more resistant to disconnection, therefore the reliability of electric connection in these circuits can be improved.

In addition, the conductors 42-1b to 42-1e constituting the airbag circuit and the conductor 42-1f constituting the horn circuit are arranged side by side, and the conductors 42-1b to 42-1e and the conductor 42-1f are arranged at the width-direction center portion of the second FFC 42. Thereby, even when the width-direction end portion of the second FFC 42 receives external force by steering or the like, the conductors 42-1b to 42-1e and the conductor 42-1f are more resistant to disconnection, thus both the airbag circuit and the horn circuit can be further prevented from being disconnected.

In addition, as the first FFC 41 includes the conductors 41-1a to 41-1c constituting the abnormality detection circuit for detecting abnormality in the first FFC 41, the conductors 41-1a to 41-1c constituting the abnormality detection circuit are arranged in the first FFC 41 which has a higher possibility of failure such as disconnection compared to the other cables. Therefore, when the abnormality detection circuit is disconnected, a user of the vehicle can be informed of the abnormality, thus the airbag circuit or the horn circuit in the second FFC 42 can be prevented from being disconnected beforehand. Also, when there is a possibility of occurrence of a failure mode in which a conductor is gradually cut, such as deterioration due to metal fatigue caused by repetitive movement, the failure mode can be predicted with the abnormality detection circuit.

Further, as the third FFC 43 includes the conductor 43-1e constituting the large current circuit such as an illumination circuit, the large current circuit is provided in the third FFC 43 other than the second FFC 42 provided with the airbag circuit. Thereby, a crossed-wire phenomenon of the airbag circuit and the large current circuit can be suppressed, then the possibility of erroneous explosion of the airbag can be reduced and secondary disaster due to the erroneous explosion can be prevented, thus safety can be further enhanced.

Figure 4:
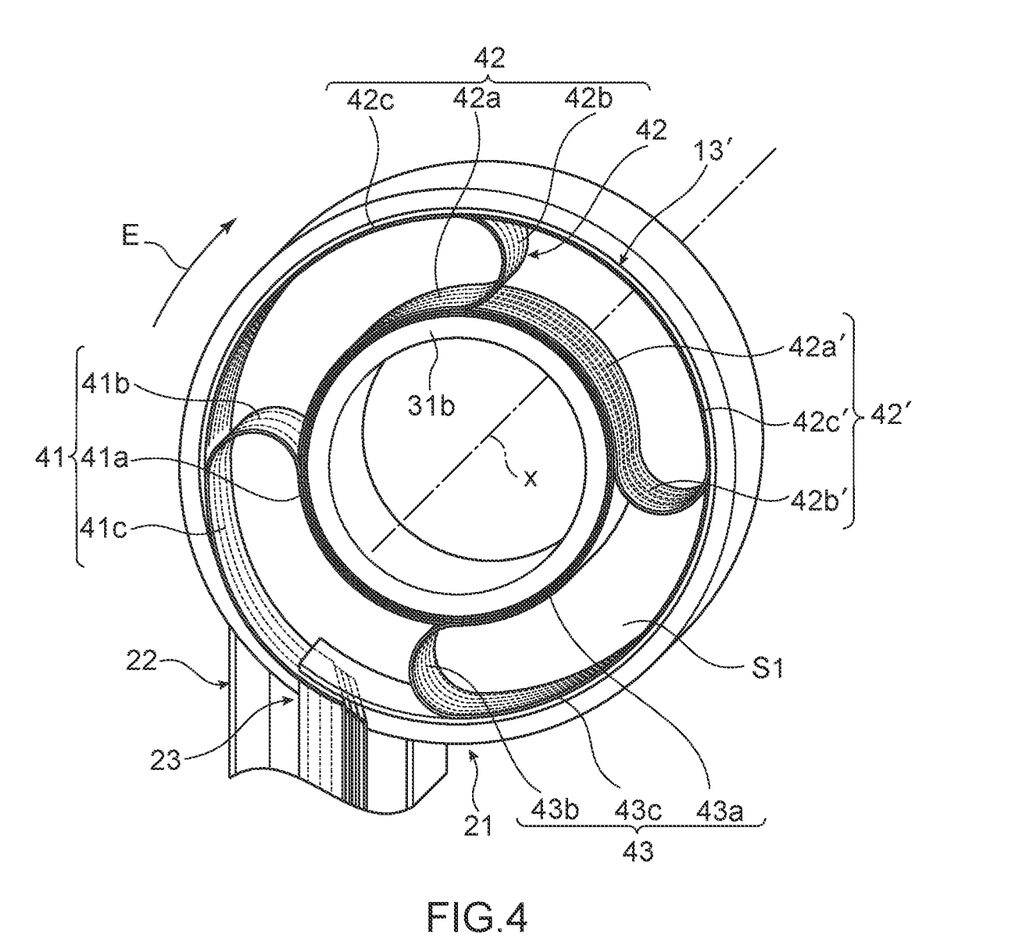
FIG. 4 is a perspective view illustrating a variation of the flexible flat cable group in FIG. 2.

FIG. 4 is a perspective view illustrating a variation of the FFC group 13 in FIG. 2. The FFC group of FIG. 4 is not provided with the dummy cable but provided with two FFCs corresponding to the second FFC 42, and in that respect, the FFC group of FIG. 4 is different from the FFC group of FIG. 2. In the following, for the same configuration as the FFC group 13 in FIG. 2, the same reference number is assigned to omit the description thereof, and different points are described.

In FIG. 4, the FFC group 13' includes a first FFC 41 wound on the inner peripheral side of the annular space S1, a second FFC 42 wound on the outer peripheral side with respect to the first FFC 41 and having a length in the annular space S1 longer than that of the first FFC 41, a spare FFC 42' wound on the outer peripheral side with respect to the second FFC 42 and having a length in the annular space S1 longer than that of the second FFC 42, being redundant of the second FFC 42, and a third FFC 43 wound on the outer peripheral side with respect to the spare FFC 42' and having a length in the annular space S1 longer than that of the spare FFC 42'. In the variation as well, within the annular space S1, four cables are arranged in rotational symmetry by substantially 90 degrees. The first FFC 41 has the shortest length among the four cables, then the second FFC 42, the spare FFC 42', and the third FFC 43 are configured to have longer lengths in the described ascending order. In addition, at the portion where the first FFC 41 to the third FFC 43 overlap each other, the second FFC 42 and the spare FFC 42' are arranged between the first FFC 41 and the third FFC 43, and four cables of the first FFC 41 to the third FFC 43 are drawn out from the annular space S1 to the stator-side connector housing space S2 of the stator-side connector housing portion 22 via the communication portion 23.

As the second FFC 42, within the annular space S1, the spare FFC 42' includes an inner periphery portion 42a' wound one or a plurality of times around the cylindrical portion 31b of the rotator 12, a folding back portion 42b' bent and folded back at the longitudinal middle part of the second FFC 42, and an outer periphery portion 42c' arranged opposite to a part of the inner periphery portion 42a' by the folding back at the folding back portion 42b. When the rotator 12 is rotated clockwise or counterclockwise, the spare FFC 42' is wound or rewound while maintaining the bending at the folding back portion 42b'.

FIGS. 5(A) to 5(D) are plan views illustrating detailed configurations of respective FFCs in FIG. 4.

Figure 5A:
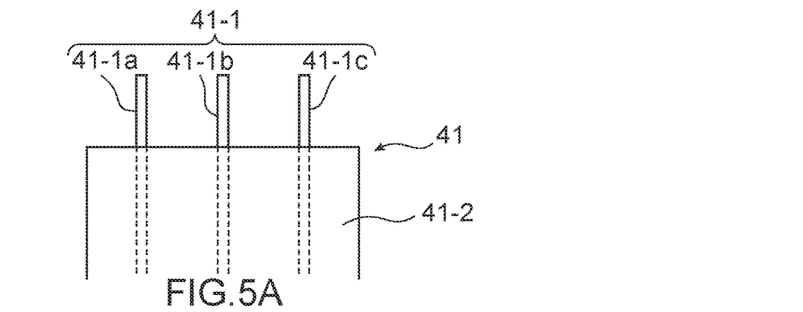
FIGS. 5(A) to 5(D) are plan views illustrating detailed configurations of the first to third flexible flat cables in FIG. 4.
Figure 5B:
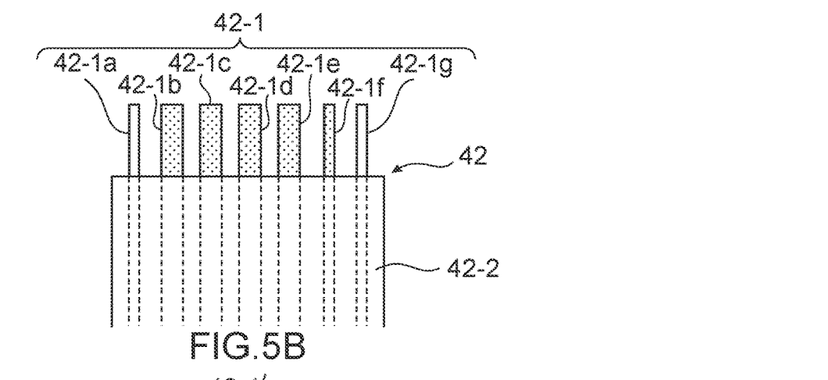

In the FFC group 13', the configuration of the first FFC 41 of FIG. 5(A) is the same as that of the first FFC 41 of FIG. 3(A), and the configuration of the second FFC 42 of FIG. 5(B) is the same as that of the second FFC 42 of FIG. 3(B), thus their descriptions are omitted.

Figure 5C:
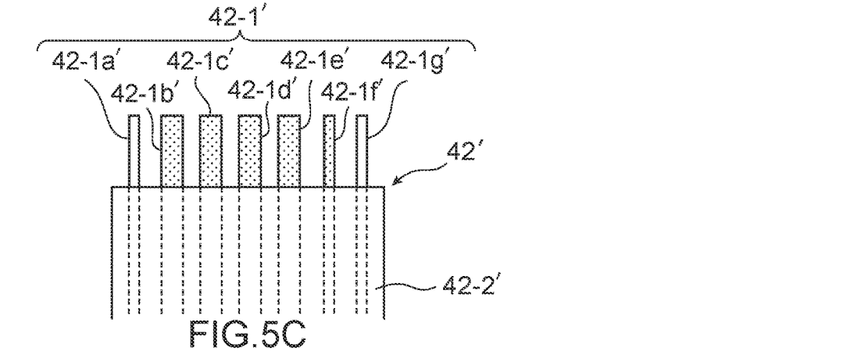

As illustrated in FIG. 5(C), the spare FFC 42' includes a conductor group 42-1' including conductors 42-1a', 42-1b', 42-1c', 42-1d', 42-1e', 42-1f, and 42-1g', and two insulator films 42-2' arranged to sandwich the conductor group 42-1' via adhesive layers (not illustrated). The conductors 42-1a' to 42-1g' include, for example, a copper alloy, and are arranged to have in-plane directions of their rolled surfaces substantially in the same direction. Among the conductors 42-1a' to 42-1g', each of the conductors 42-1b' to 42-1e' has a width of 1.5 mm to 2 mm, and a thickness of 0.02 mm to 0.05 mm, for example, and their respective widths are larger than those of the other conductors 42-1a', 42-1f, and 42-1g'. As the configuration of the insulator film 42-2' is basically the same as that of the insulator film 42-2, the description thereof is omitted.

Among the conductors 42-1a' to 42-1g', the four conductors 42-1b' to 42-1e' are connected to the airbag circuit, and the conductor 42-1f is connected to the horn circuit. That is, the spare FFC 42' includes both the conductors 42-1b' to 42-1e' (other first conductors) constituting the airbag circuit and the conductor 42-1f (other second conductor) constituting the horn circuit. As described above, since the extra length of the second FFC 42 is longer than that of the first FFC 41, when the rotator 12 is rotated by steering, the conductor group 42-1' is less susceptible to longitudinal tensile force (external force) than the conductor group 41-1. Therefore, the conductors 42-1b' to 42-1e' constituting the airbag circuit and the conductor 42-1f constituting the horn circuit are both arranged in the spare FFC 42' which is less likely to have a failure such as disconnection compared to the other cables.

In addition, among conductors 42-1b' to 42-1e', the conductors 42-1b' (AB+) and 42-1c' (AB−) constitute one path of the airbag circuit, and the conductors 42-1d' (AB+') and 42-1e' (AB−') constitute the other path of the airbag circuit. Specifically, the conductors 42-1b' to 42-1e' constitute an ignition output circuit of a two-stage gas generator (dual inflator), then the conductors 42-1b' to 42-1c' are connected to one inflator provided in the airbag, and the conductors 42-1d' to 42-1e' are connected to the other inflator provided in the same airbag, respectively. Then, the two ignition output circuits are used to adjust the ignition timing based on various input information such as an impact applied to the vehicle, thereby controlling the expansion amount of the airbag.

In the spare FFC 42', the conductors 42-1b' to 42-1e' constituting the airbag circuit and the conductor 42-1f constituting the horn circuit are arranged side by side, and the conductors 42-1b' to 42-1e' and 42-1f are arranged at the width-direction center portion of the spare FFC 42'. In addition, the spare FFC 42' further includes the conductor 42-1a' and the conductor 42-1g' (the other conductors) arranged on both width-direction opposite end sides of the conductors 42-1b' to 42-1e' and 42-1f. Thus, none of the conductors 42-1b' to 42-1f are arranged at the outermost portion with respect to the width direction of the spare FFC 42', and they are positioned inside of the width direction of the spare FFC 42'. Still, the spare FFC 42' may include the conductor 42-1a' and/or the conductor 42-1g' (at least one of the other conductors) arranged on at least one of width-direction opposite end sides of the conductors 42-1b' to 42-1e' and 42-1f.

Figure 5D:
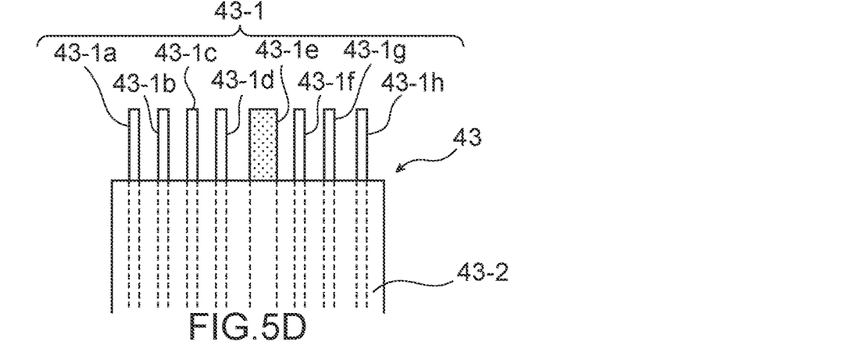

The configuration of the third FFC 43 of FIG. 5(D) is the same as that of the third FFC 43 of FIG. 3(C), thus the description thereof is omitted. As the conductor 43-1e of FIG. 3(C), the conductor 43-1e of FIG. 5(D) is still preferably arranged at the width-direction center portion of the third FFC 43. Thereby, the conductor 43-1e becomes less susceptible to external force applied to the width-direction end portion of the third FFC 43, and a crack progressing from the end portion cannot easily reach the conductor 43-1e, thus the conductor 43-1e becomes more resistant to disconnection. Accordingly, the large current circuit such as an illumination circuit can be prevented from being disconnected.

Accordingly, in the variation, the ignition output dual circuit is formed in the second FFC 42, and further, the ignition output dual circuit is also formed in the spare FFC 42'. In addition, one horn circuit is formed in the second FFC 42, and further, one horn circuit is also formed in the spare FFC 42'.

According to the variation, the rotary connector device 1 further includes the spare FFC 42' (spare FFC) redundant of the second FFC 42, and the spare FFC 42' includes both the conductors 42-1b' to 42-1e' constituting the airbag circuit and the conductor 42-1f constituting the horn circuit, such that each of the airbag circuit and the horn circuit are provided with two paths in the different cables. Therefore, even when the airbag circuit of the second FFC 42 is disconnected, due to redundancy of the airbag circuit by the spare FFC 42', the connection state of the airbag circuit can be secured, thereby high reliability of the airbag operation can be achieved and safety can be further enhanced. Similarly, even when the horn circuit of the second FFC 42 is disconnected, due to redundancy of the horn circuit by the spare FFC 42', the connection state of the horn circuit can be secured, thereby high reliability of the horn circuit can be achieved.

While the embodiments according to the rotary connector device have been described above, the present invention is not limited to the described embodiments, and all sorts of variations and modifications are possible based on the technical concept of the present invention.

For example, in the second FFC, the widths of the conductors constituting the airbag circuit and/or the width of the conductor constituting the horn circuit may be larger than the other conductors. Thereby, the circuits can be further prevented from being disconnected.

Further, in the first FFC, the second FFC, and the third FFC, the number of each type of conductors other than the airbag circuit and the horn circuit is not limited to that of the present embodiment, and may be changed to the different number according to the application and specification. For example, the first FFC includes three conductors constituting the abnormality detection circuit for detecting abnormality of the first FFC, however, the first FFC is not limited to this configuration and may include at least one conductor constituting the abnormality detection circuit for detecting abnormality of the first FFC. In addition, the first FFC may further include other conductors constituting other circuits other than the conductors constituting the abnormality detection circuit.

The second FFC 42 includes a plurality of conductors 42-1b to 42-1e constituting the airbag circuit, however, the second FFC is not limited to this configuration and may include at least one conductor constituting the airbag circuit. The second FFC 42 includes one conductor 42-1f constituting the horn circuit, however, the second FFC 42 is not limited to this configuration and may include at least one conductor constituting the horn circuit.

The spare FFC 42' includes a plurality of conductors 42-1b' to 42-1e' constituting the airbag circuit, however, the spare FFC 42' is not limited to this configuration and may include at least one conductor constituting the airbag circuit. Also, the spare FFC 42' includes one conductor 42-1f constituting the horn circuit, however, the spare FFC 42' is not limited to this configuration and may include at least one conductor constituting the horn circuit.

The third FFC includes a conductor constituting the large current circuit through which large current flows, however, the third FFC is not limited to this configuration and may further include other conductors constituting other circuits other than the conductor constituting the large current circuit.

Further, in the embodiments, the FFC group includes three FFCs or four FFCs, however, the FFC group is not limited to this configuration and may include five or more FFCs. In this case, three or more second FFCs including both the conductors constituting the airbag circuit and the conductor constituting the horn circuit may be provided.

Further, the configurations other than the FFC group in the rotary connector device are not limited to the embodiments described above, and may have other forms and structures.

REFERENCE SIGNS LIST

1 Rotary connector device
11 Stator
12 Rotator
13 Flexible flat cable group (FFC group)
13' Flexible flat cable group (FFC group)
21 Stator main body
22 Stator-side connector housing portion
23 Communication portion
31 Rotator main body
31a Top plate portion
31b Cylindrical portion
32 Rotator-side connector housing portion
32a Rotating-side terminal insertion hole
40 FFC connection structure tool
41 First FFC
41a Inner periphery portion
41b Folding back portion
41c Outer periphery portion
41-1 Conductor group
41-1a, 41-1b, 41-1c Conductor
41-2 Insulator film
42 Second FFC
42' Second FFC 42a Inner periphery portion
42b Folding back portion
42c Outer periphery portion
42a' Inner periphery portion
42b' Folding back portion
42c' Outer periphery portion
42-1 Conductor group
42-1a, 42-1b, 42-1c, 42-1d Conductor
42-1e, 42-1f, 42-1 g Conductor
42-2 Insulator film
42-1' Conductor group
42-1a', 42-1b', 42-1c', 42-1d' Conductor
42-1e', 42-1f, 42-1g' Conductor
42-2' Insulator film
43 Third FFC
43a Inner periphery portion
43b Folding back portion
43c Outer periphery portion
43-1 Conductor group
43-1a, 43-1b, 43-1c, 43-1d Conductor
43-1e, 43-1f, 43-1 g, 43-1 h Conductor
43-2 Insulator film
44 Dummy cable
44a Inner periphery portion
44b Folding back portion
44c Outer periphery portion
S1 Annular space
S2 Stator-side connector housing space
S3 Rotator-side connector housing space
x Axis line

The invention claimed is:

1. A rotary connector device comprising:
a stator;
a rotator rotatably connected to the stator; and
a flexible flat cable group housed capable of being wound and rewound in an annular space between the stator and the rotator,
the flexible flat cable group including
a first flexible flat cable wound on an inner peripheral side of the annular space; and
a second flexible flat cable wound on an outer peripheral side with respect to the first flexible flat cable, having a length in the annular space longer than that of the first flexible flat cable, the second flexible flat cable including both
first conductors constituting an airbag circuit;
a second conductor constituting a horn circuit, and
a third flexible flat cable wound on an outer peripheral side with respect to the second flexible flat cable, having a length in the annular space longer than that of the second flexible flat cable, wherein the third flexible flat cable includes third conductors constituting a large current circuit through which larger current flows than an airbag circuit.

2. The rotary connector device according to claim 1, wherein
the second flexible flat cable includes the first conductors constituting the airbag circuit and the second conductor constituting the horn circuit, the first conductors and the second conductors being arranged side by side; and
the first conductors and the second conductor are arranged at a width-direction center portion of the second flexible flat cable.

3. The rotary connector device according to claim 2, wherein the second flexible flat cable includes at least another conductor arranged on at least one of width-direction opposite end sides of the first conductors and the second conductor.

4. The rotary connector device according to claim 1, further comprising a spare flexible flat cable wound on an outer peripheral side with respect to the second flexible flat cable, being redundant of the second flexible flat cable, wherein the spare flexible flat cable includes both
other first conductors constituting an airbag circuit; and
another second conductor constituting a horn circuit.

5. The rotary connector device according to claim 1, wherein a width of the third conductor constituting the large current circuit is larger than that of the first conductor constituting the airbag circuit.

6. The rotary connector device according to claim 1, wherein the first flexible flat cable includes at least one fourth conductor constituting an abnormality detection circuit for detecting abnormality of the first flexible flat cable.

* * * * *